Figure 1:
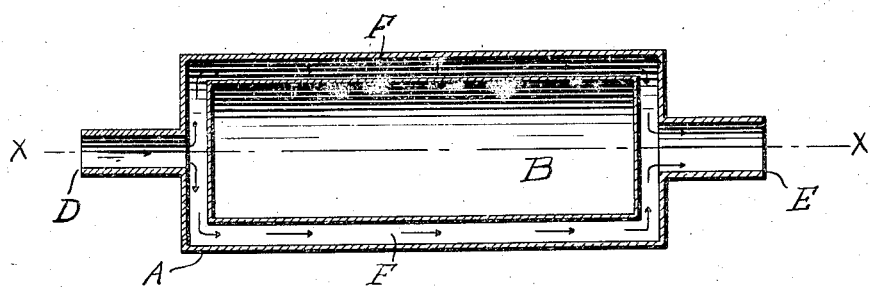

April 29, 1924.

J. F. WAIT

PROCESS OF TREATMENT OF CHEMICAL COMPOUNDS

Filed Dec. 9, 1920

1,492,497

X—X = Axis of Rotation

Inventor
Justin F. Wait
By [signature]
Attorney

Patented Apr. 29, 1924.

1,492,497

UNITED STATES PATENT OFFICE.

JUSTIN F. WAIT, OF NEW YORK, N. Y.

PROCESS OF TREATMENT OF CHEMICAL COMPOUNDS.

Application filed December 9, 1920. Serial No. 429,418.

*To all whom it may concern:*

Be it known that I, JUSTIN F. WAIT, a citizen of the United States, residing at New York city, in the county of Bronx and State of New York, have invented certain new and useful Improvements in Processes of Treatment of Chemical Compounds, of which the following is a specification.

This invention relates to the process of preparation or manufacture of chemical compounds wherein the reaction is carried on under pressure in excess of atmospheric. During such chemical reaction it is often advisable to assist the reaction by the addition or abstraction of heat from the reacting substances in some instances this addition or abstraction of heat causing a change in the temperature of the reacting components.

The invention is also adaptable to the process or method of modification, combination or separation of chemical compounds or other materials wherein the modification, combination or separation may be conveniently carried out under pressures in excess of atmospheric. With some modifications, combinations and separations it is desirable to add or abstract heat from the masses undergoing such modification, combination or separation.

I have found that the following improved methods of preparation or manufacture of chemicals or the modification, combination or separation of various substances under pressure in excess of atmospheric, will yield satisfactory results with low costs and will permit of the preparation, modification, combination or separation of such chemicals, substances and materials as would otherwise be very difficult or practically impossible to attain. The degree of control which may be exercised over the process of preparation, manufacture, modification, combination or separation of substances by this process of operation, renders certain the continuous obtainment of the results desired.

The term "component" or "component part" means a definite substance or mixture of substances which enter into a chemical reaction or physical change, or which is a product of such reaction or change.

By modification of form is meant the change from a given physical or chemical form to another form with different physical or chemical characteristics. By separation is meant both total separation in which one substance is removed from contact with another and the process of altering the relative concentrations or proportions of the component parts of any given substance or mixture of substances.

The term "separation" is limited in meaning to those instances in which the separation is effected or influenced by properties of the mass acquired by the submittance of the same to a pressure in excess of atmospheric or to a temperature which would tend to yield an atmosphere with a pressure about the masses in excess of normal atmospheric.

By combination is meant the union between two component parts which is effected when these parts are intimately mixed to form what is apparently a homogeneous mass, such union being either chemical or physical in nature.

The method, however, is also new in its application to a separation process other than the above and in which the separation is effected by the action of centrifugal force alone but within a mobile mass which exists with the particular composition and the particular temperature under consideration only because of the pressure (in excess of atmospheric) which is imposed upon it by the process which I have invented.

In this special case it differs from the standard practice of separation by the application of centrifugal force to such a mass since the latter practice permits of operation only with those systems or chemical masses under such conditions of temperature, composition and concentration as are stable under normal atmospheric pressure.

Figure 2:
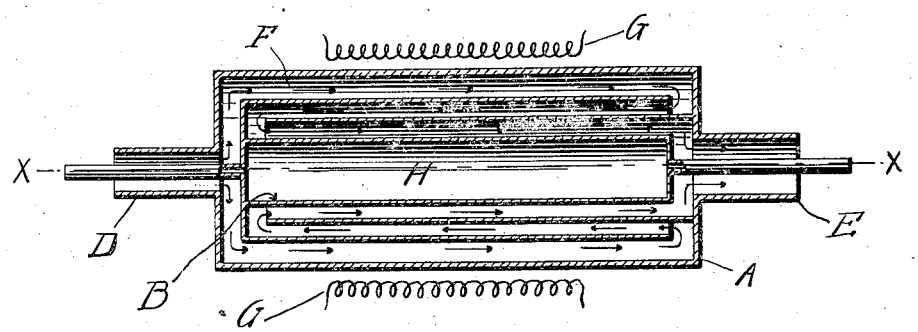
Figure 3:
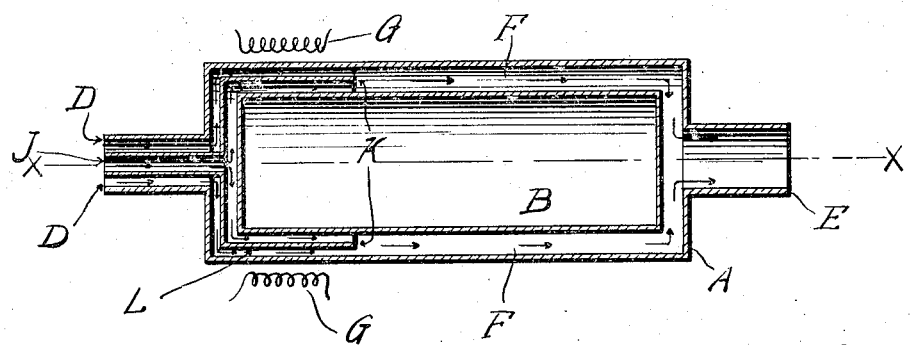

In the accompanying drawings Figs. 1, 2 and 3 are diagrammatic sections of vessels in which the processes may be performed.

The method in one of its simple forms consists of the passage of the chemicals or materials through a rapidly rotating vessel as is shown in section in Fig. 1. The vessel consists of a cylindrical shell, or drum "A" with a chamber "F" formed by the enclosure between "A" and an inner shell or drum "B." The chamber possesses an axial inlet opening "D" and an outlet "E."

The process necessitates the passage of all of the material through a section close to the periphery of the vessel since the material must pass outward from the central opening "D" as is indicated by the arrows. The exact path of flow is determined by the shape and size of chamber "F" which may be very complicated in shape and vary greatly in length depending upon the nature of the substances and the reaction or modification to be carried out. The chamber "F" is essential to good operation of such a process.

In accordance with definite mathematical laws, the pressure maintained on the mass filling a rotating vessel will increase as it passes towards the periphery of the apparatus. This pressure is the predominating influence causing chemical reaction, modification of form, combination or separation in many cases. The pressure determines the state of equilibrium of a chemical or mixture for the particular conditions of composition, temperature and concentration under consideration. Therefore, certain desired chemical and physical forms may be obtained by the employment of definite control of the pressure and the temperature such as may be obtained by the methods suggested herein.

The absolute control of the direction of flow and the resulting submittance of the masses being treated to the pressures existing in the outer chamber for definite periods and under certain predetermined pressure values, constitute a major part of this invention. Such control is essential to successful operation in most of the cases to which this invention may be applied.

Some chemical reactions, modifications of form, combination and separation of substances are greatly facilitated by the passage of such substances through a revolving vessel as shown schematically in Fig. 2. In this instance the substances enter "D" and pass through the tortuous chamber "F" to the outlet or discharge "E," this chamber being produced or extended by alternating shells with spaces therebetween communicating at opposite ends alternately. During the passage the substances are heated by means of an electrical heating device, or its equivalent, as indicated by "G" and later cooled by transfer of the heat contained therein through the walls of shell "B," into the chamber "H" where it is continuously removed as by the passage therein of a cooling agent such as water or cold brine by means of pipes I.

In such a method of operation the reaction, modification, combination or separation may be carried out with a temperature above the boiling point, transition point or decomposition point of any component of the system or mass being treated. Because of this it is possible to select a temperature and pressure most favorable to the production of the results desired. The cooling of the substances before discharge lowers the temperature below the temperature of boiling, transition or decomposition for the particular pressure into which the substances are discharged as they leave the vessel.

Another modification of the process is exemplified by a process consisting of the passage of two component parts of the reaction, to be carried out, into the "reaction" chamber "F" of a revolving vessel somewhat as shown in Fig. 3. One component may enter through "D" while the second part may enter through "J," the chamber "F" being so designed with a wall "L" that these two substances will not be brought into contact until they have reached the outermost section of "F." At some point "K" they are allowed to mix thus giving rise to the desired reaction. In a few instances it is desirable to mix the components at some intermediate point between the outside section and the place of entrance.

This process is applicable to those reactions or modifications which would give rise to side reactions or products other than those desired if the component parts were allowed to mix at any pressure other than that existing at "K." In some instances it is desirable to heat one of the component parts only as may be done by the application of the heating unit "G." The heat may of course be applied to both components either before or after mixing and a means for cooling may be applied as indicated in Fig. 2.

Another application of the process is in the separation of substances which are passed through the chamber unchanged chemically or the separation of those which are produced by chemical reaction occurring within the chamber. Such a chamber may be carried out in apparatus similar in form to that shown in Fig. 3 but in which the direction of flow is reversed.

In order to reverse the direction of flow it would be necessary to change the diameter of outlet "E" so that the outermost edge of this opening would be nearer to the center of rotation than the edge of "J". "E" could then be used as the inlet and "J" and "D" the outlet ports. The relative diameters of "J" and "D" would then be adjusted so that the desired separation would be effected.

The separation in this case would be due to the fact that the two component parts to be separated would layer out due to a difference in specific gravity or else the composition of the masses in the outer portion of "F" would differ from that in the inner portion. The discharge from "D" would therefore differ from that at "J" thus effecting the desired separation.

By the term "transition point" is meant the division line or surface, or that part thereof which is under consideration, between two states of physical or chemical equilibrium. When the physical and chemical conditions of composition, temperature pressure and concentration on one side of the line are met with, a definite equilibrium exists whereas with those conditions on the other side of the line a different equilibrium is met with, the change in equilibrium meaning that a definite change in the chemical or physical properties of one or more of the component parts has taken place. The term is familiar to those acquainted with the art.

To assist the chemical reaction, a catalyst may be placed in the revolving vessel, or the mass may by suitable means be subjected to the action of electric current while revolving.

The following examples describe a few of the reactions to which the process may easily be applied and which have been carried out in a manner equivalent to that above described.

If 2-naphthol-7-sulfonic acid is passed through the unit with ammonia water and heat is applied to the part of the reaction in the outermost section so that the temperature therein will be about 190° C. the compound known as "F" acid is produced. The discharging portion must be cooled.

If paranitrochlorbenzol is dissolved in a mixture of alcohol and ammonia in a manner to give an excess of ammonia and this mixture is passed thru the unit, in accordance with the process described, a temperature of about 200° C. being maintained in the outermost compartment or section, a good yield of pure paranitraniline is obtained.

The application of the process for the chlorination of toluol will yield a high percentage of chlortoluols in which the chlorine is in the side chain of the molecule. For operation in this manner the temperature in the outer section should be raised to about 125° C. and the cooling should be such as to maintain a temperature of about 50° C. in the discharged liquors.

The foregoing examples indicate some of the variations in operation and some of the uses to which my invention may be put but I do not limit my claims to these specific cases which serve merely to describe some of the fundamental principles involved.

I claim:

1. A process for treatment of chemical compounds involving passing of the components through a rotating vessel and causing the desired chemical effect by the pressure exerted by centrifugal force applied to the components within the vessel.

2. A process for the treatment of chemical compounds involving passing of the components through a rotating vessel and causing the desired chemical effect by the pressure exerted by centrifugal force applied to the components within the vessel, and subjecting the same to heat while in said vessel.

3. A process for the treatment of chemical compounds involving passing of the components through a rotating vessel and causing the desired chemical effect by the pressure exerted by centrifugal force applied to the components within the vessel and subjecting the same to heat variations by the passage of a fluid through a chamber in the vessel separated from the chemical compounds.

4. A process for the combination of substances consisting of passing the component parts through a rotating vessel wherein the parts are made to pass through confined zones, causing each portion to be subjected to the pressure developed in the outer zone by the centrifugal force of the mass in rotation.

5. The process of making chemical compounds, comprising feeding the components of the compound through separate passages into a rotating vessel, mixing said substances, and subjecting the same to superatmospheric pressure created by centrifugal force developed by their rotation.

6. The process of making chemical compounds, comprising feeding the components of the compound through separate passages into a rotating vessel, mixing said substances, and subjecting the same to superatmospheric pressure created by centrifugal force developed by their rotation, and varying the temperature of the same while in said vessel.

7. A process for assisting the reaction of chemicals involving the passage of the reacting components through a revolving chamber wherein they are subjected to pressure developed by the centrifugal force of the chemicals and subjecting the same to the influence of catalytic ingredient while in said chamber.

8. A process for the treatment of chemicals consisting of the passage of the chemicals through a revolving chamber, varying the temperature of the masses while under the pressure exerted by the centrifugal forces of the masses, and subjecting these masses to the catalytic effect of a reagent while within the chamber.

9. A process for the treatment of chemicals consisting of the passage of the chemicals through a revolving chamber in which they are subject to the pressure created by the centrifugal force of the component masses and in which they are made to travel outward towards the periphery of the chamber with subsequent travel towards the center, the reaction being produced or influenced by the pressure, and varying the heat of the masses while within the chamber.

10. A process for the treatment of chemicals consisting of the passage of liquid chemicals through a rotating chamber, and passing a gaseous fluid into the chamber reacting with said liquids as they are subjected to the pressure created by the centrifugal forces of the masses.

11. A process for the treatment of chemicals consisting of passing liquid chemicals through a rotating chamber, and passing a gaseous fluid into the chamber reacting with said liquids as they are subjected to the pressure created by the centrifugal forces of the masses, and varying the heat of the reacting components.

12. A process for the preparation of chemical compounds consisting of passing the component parts through a rotating vessel and restricting the flow therein so that the parts are caused to take definite paths through the vessel, and subjecting the same to pressure due to centrifugal force while rotating.

13. A process for the preparation of chemical compounds involving passing the component parts through definite paths or channels within a revolving vessel, the passage of the components being carried out while said vessel is rotating, and subjecting the same to pressure due to centrifugal force.

14. A process for the treatment of chemical compounds consisting in the passage of the component parts through a vessel revolving and heating the same to a temperature in excess of the boiling point of the mass or any one of the component parts at normal atmospheric pressure, without exceeding the boiling point of the parts under the pressure conditions incident to centrifugal force of the part of the vessel in which they exist at that temperature.

15. A process for the treatment of chemical compounds involving the passage of the component parts through a rotating vessel, and subjecting the same to a temperature in excess of the boiling or transition points at normal atmospheric pressure, the boiling or transition being restrained by the subjection of the component parts to the pressure developed by the centrifugal force of the masses at the point where such excess temperature is attained.

16. A process for the treatment of chemical compounds involving passing the component parts thereof through a revolving vessel and directing the flow of all of the component parts at one period through the outermost section of the vessel.

17. A process for the treatment of chemical compounds involving passing the component parts thereof through a revolving vessel, directing the flow of all of the component parts at one period through the outermost section or chamber of the vessel, and discharging the separated parts through distinct channels connecting with the outermost section of the vessel.

18. A process for the treatment of chemicals involving passing the components through a revolving vessel and subjecting all of the component parts to approximately the same pressure created by centrifugal force at all times while they are within the said vessel.

In testimony whereof, I affix my signature in presence of two witnesses.

JUSTIN F. WAIT.

Witnesses:
ADALINE JOYCE,
J. CLAUDE CONNELLY.